United States Patent [19]

Shu

[11] Patent Number: 5,517,335
[45] Date of Patent: May 14, 1996

[54] APPARATUS AND METHOD FOR ENHANCING COLOR SATURATION IN HALFTONED IMAGES

[75] Inventor: Joseph S. Shu, San Jose, Calif.

[73] Assignee: Seiko Epson Corporation, Tokyo, Japan

[21] Appl. No.: 320,541

[22] Filed: Oct. 11, 1994

[51] Int. Cl.$^6$ .............................. H04N 1/56; H04N 1/60
[52] U.S. Cl. .......................... 358/518; 358/520; 358/530; 358/534
[58] Field of Search ...................... 358/520, 518, 358/515, 530, 532, 534, 527, 529, 523; 382/160, 167, 275; 364/526; 345/153; 348/645, 646, 647, 703; 395/131, 109

[56] References Cited

U.S. PATENT DOCUMENTS

| | | | |
|---|---|---|---|
| 4,668,979 | 5/1987 | Jüng | 358/520 |
| 4,789,892 | 12/1988 | Tsuzuki et al. | 358/517 |
| 4,855,765 | 8/1989 | Suzuki et al. | 347/115 |
| 4,887,150 | 12/1989 | Chiba et al. | 358/523 |
| 4,916,531 | 4/1990 | Genz et al. | 358/520 |
| 4,959,712 | 9/1990 | Tsuzuki et al. | 358/517 |
| 5,003,326 | 3/1991 | Suzuki et al. | 347/115 |
| 5,077,606 | 12/1991 | Hatabe et al. | 358/520 |
| 5,130,935 | 7/1992 | Takiguchi | 364/526 |
| 5,202,935 | 4/1993 | Kanamori et al. | 382/162 |
| 5,204,948 | 4/1993 | Kato | 358/520 |
| 5,231,504 | 7/1993 | Magee | 358/520 |
| 5,233,413 | 8/1993 | Fuchsberger | 358/518 |
| 5,251,023 | 10/1993 | Arimoto et al. | 358/529 |
| 5,278,670 | 1/1994 | Eschbach | 358/453 |
| 5,283,671 | 2/1994 | Stewart et al. | 358/534 |
| 5,303,071 | 4/1994 | Kakimura | 358/519 |
| 5,307,182 | 4/1994 | Maltz | 358/518 |
| 5,317,426 | 5/1994 | Hoshino | 358/515 |
| 5,319,473 | 6/1994 | Harrington | 358/501 |
| 5,452,017 | 9/1995 | Hickman | 358/520 |

*Primary Examiner*—Scott A. Rogers
*Assistant Examiner*—Fan Lee
*Attorney, Agent, or Firm*—Eric B. Janofsky; Charles J. Barbas

[57] ABSTRACT

Adaptive preprocessing is performed on the three primary color signals generated during the scanning of a color image in order to enhance the perceived saturation of the dominant primary color. This preprocessing is performed by removing a small increment from the least intense primary color and adding the same increment to the most intense primary color. In this manner the overall brightness of the pixel is preserved, but the perceived saturation is increased. The increment that is effectively transferred from the least intense primary color value to the most intense primary color value is based on the relations of the three primary color values to each other in order to avoid visible color artifacts.

24 Claims, 6 Drawing Sheets

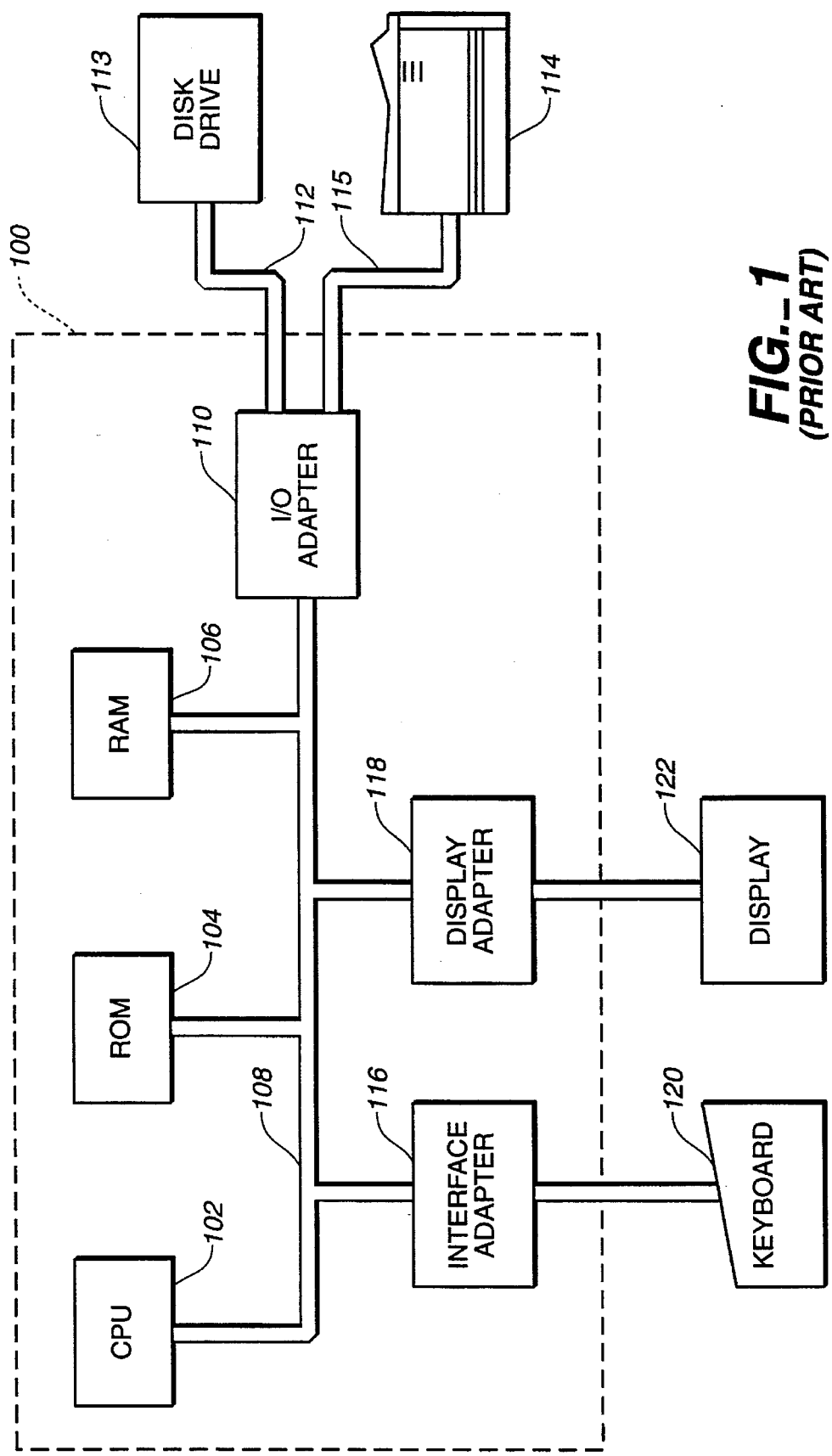
FIG._1
(PRIOR ART)

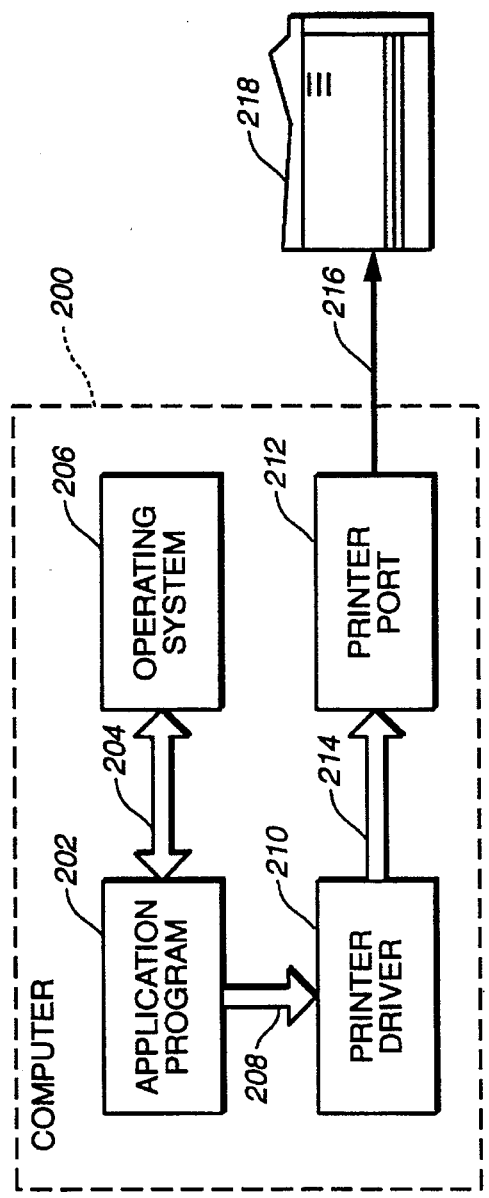
FIG._2 (PRIOR ART)
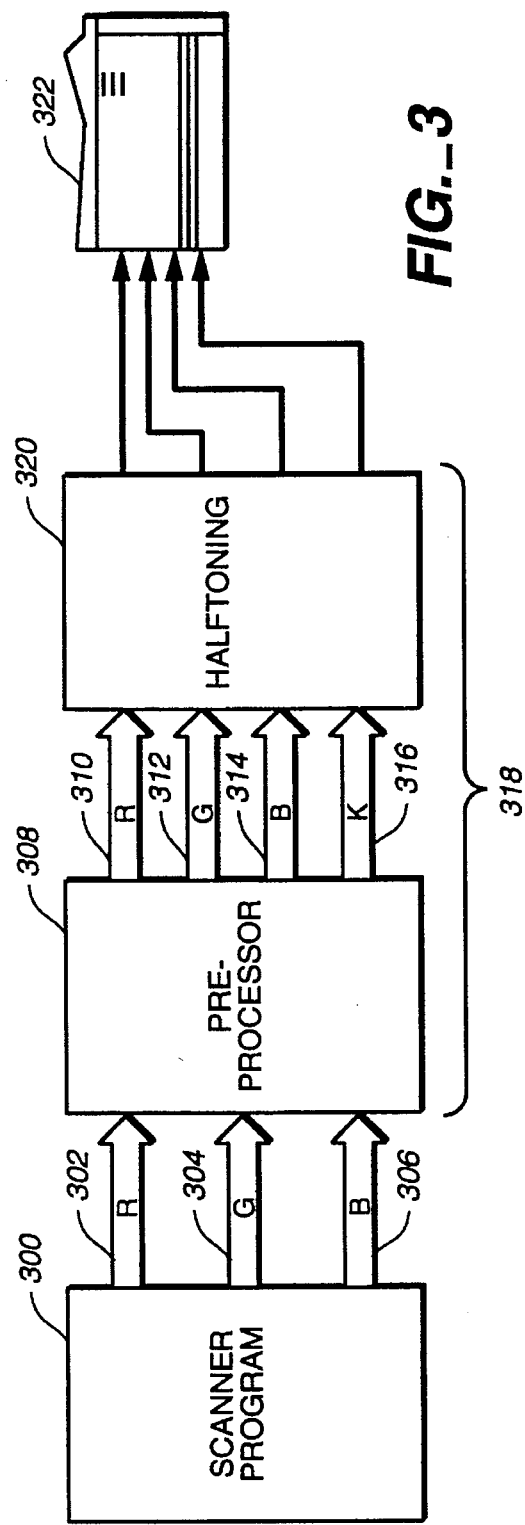
FIG._3

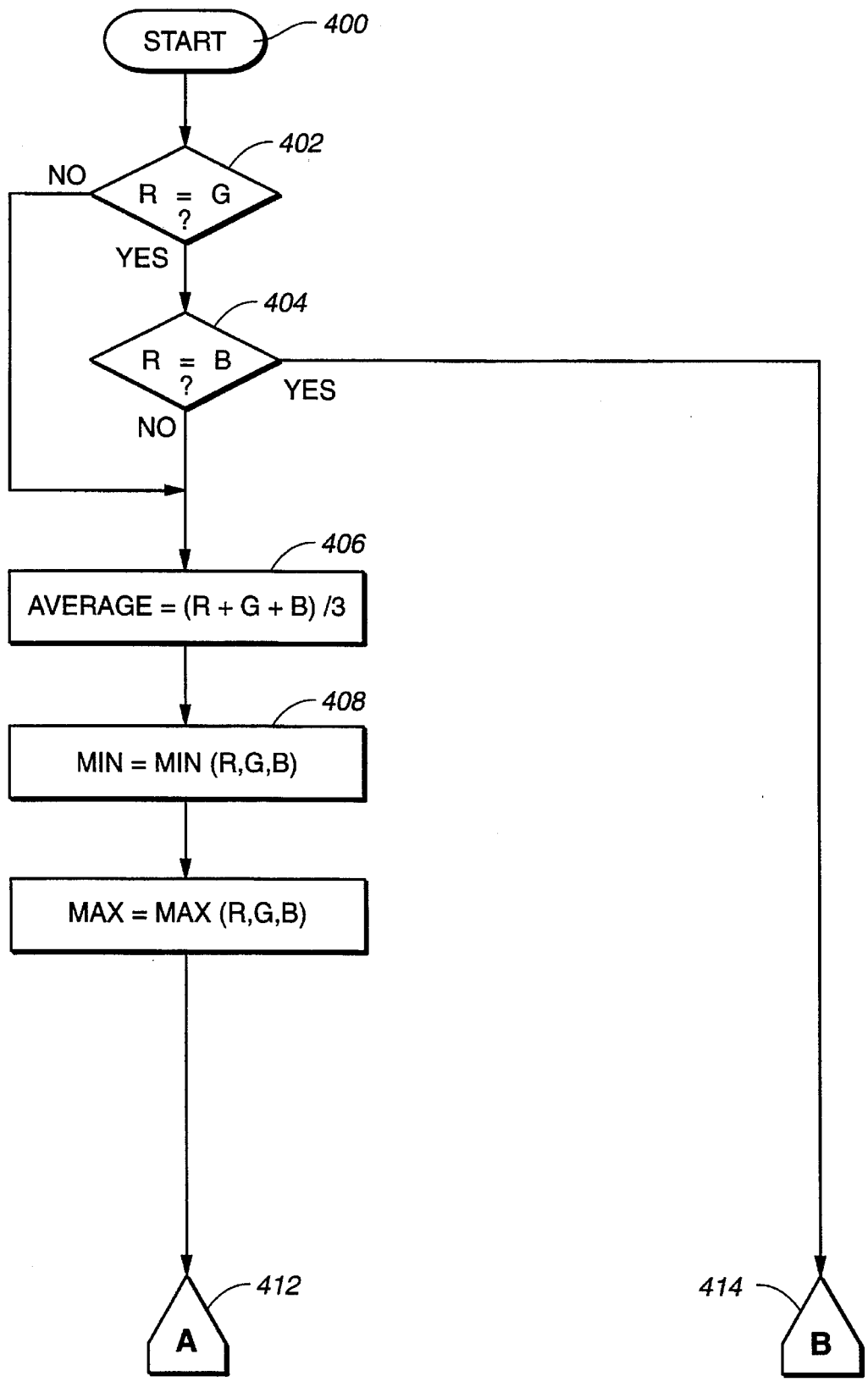
FIG._4A

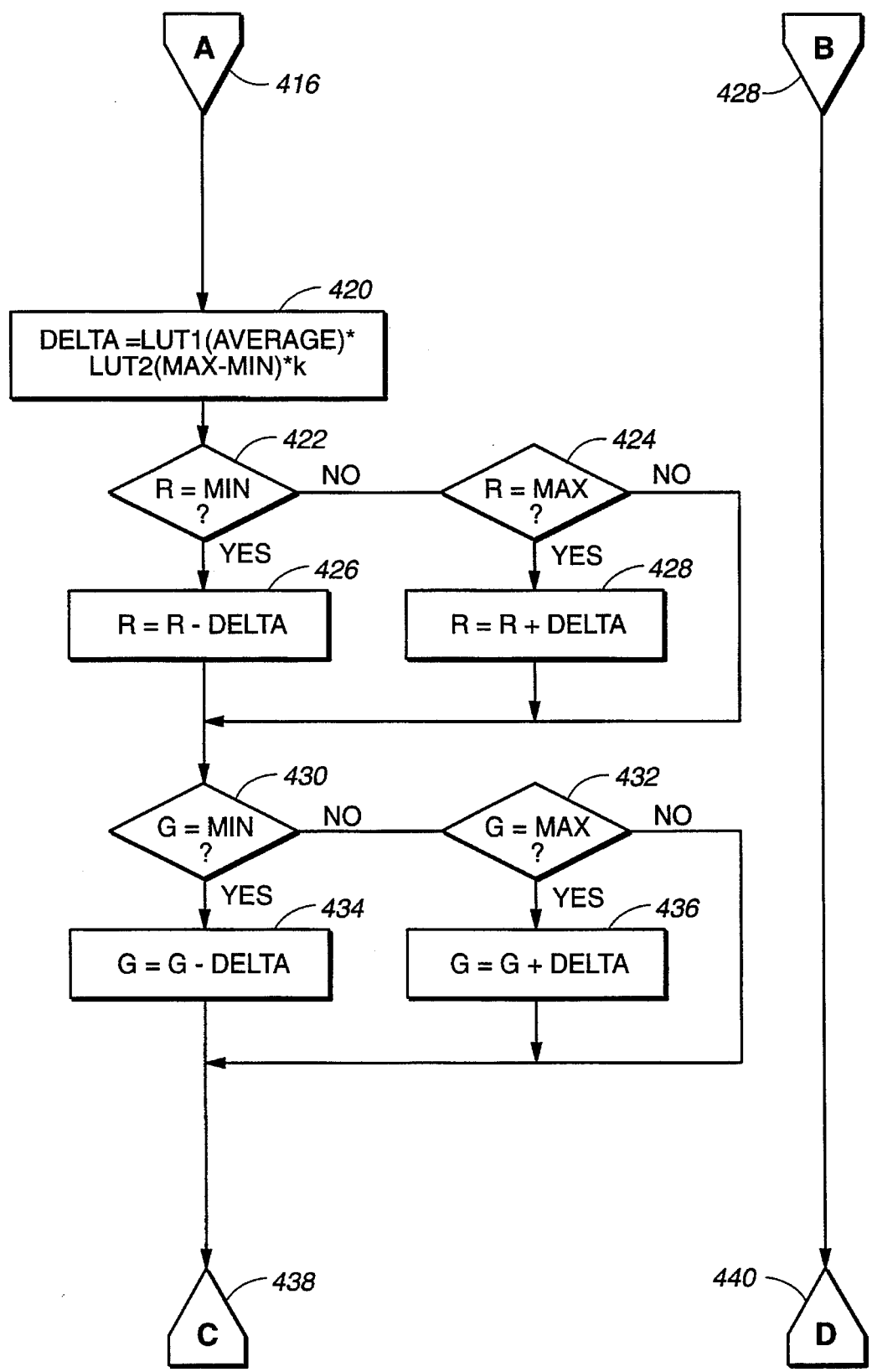
FIG._4B

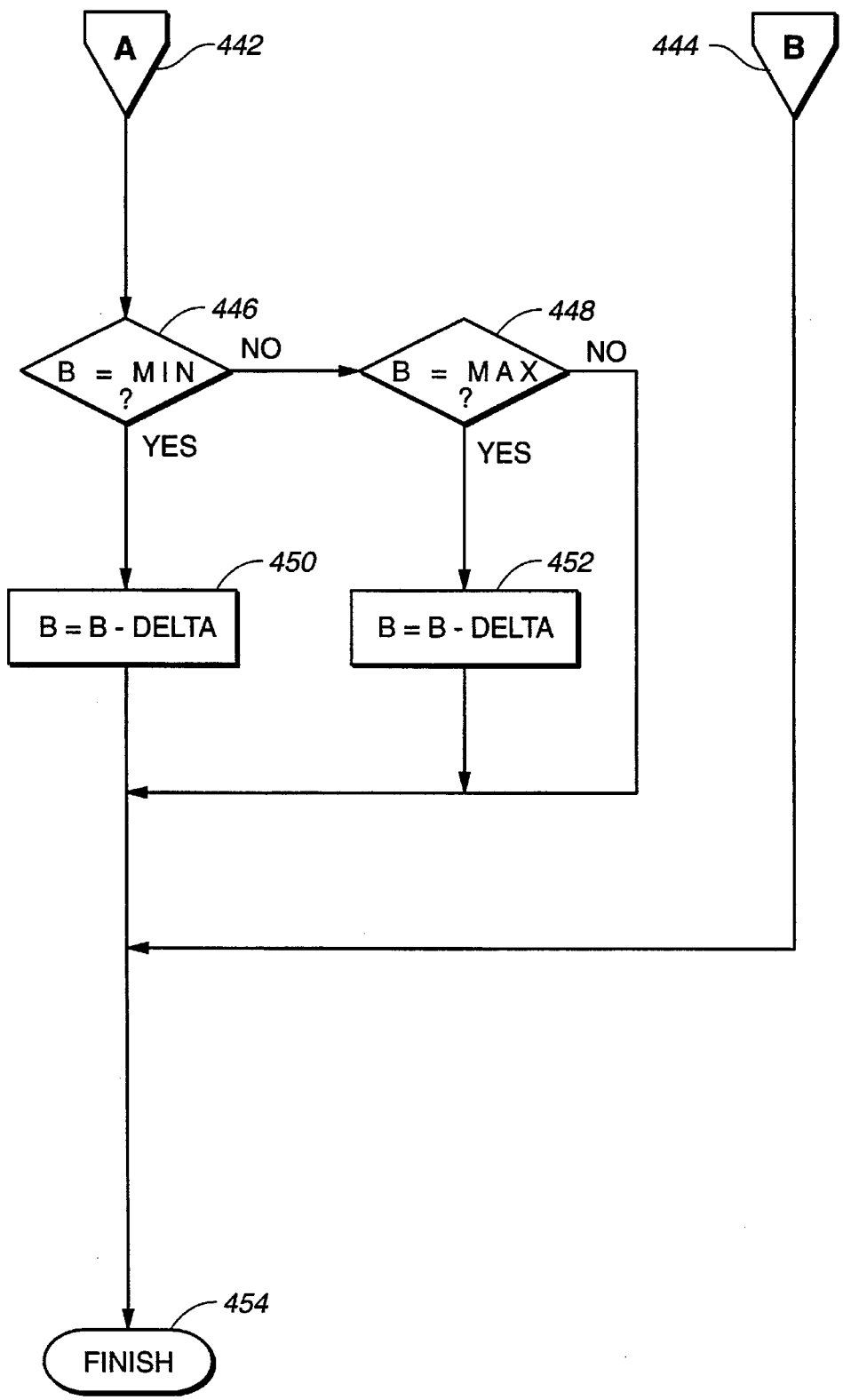
*FIG._4C*

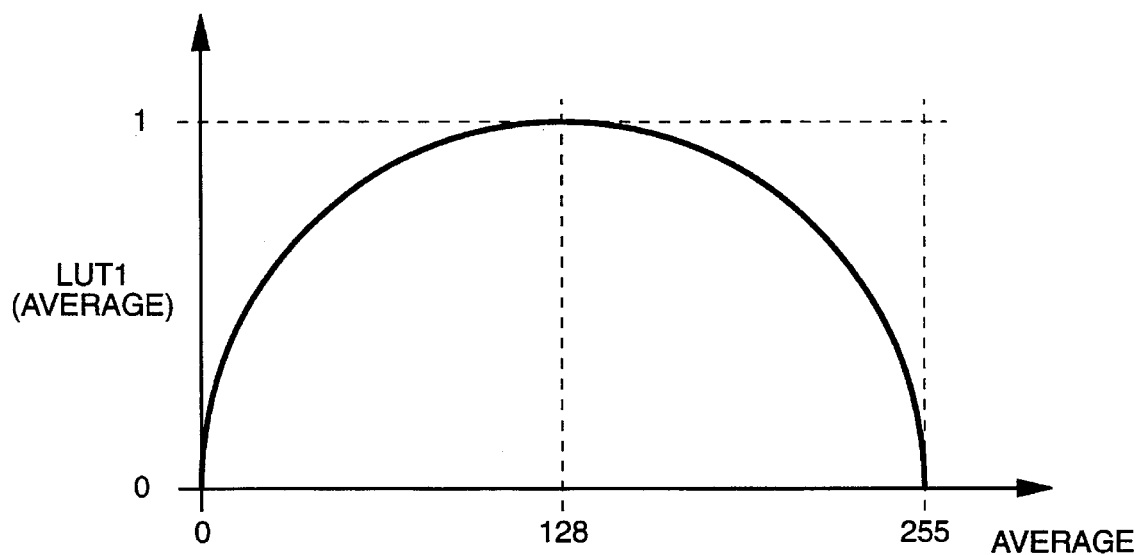
FIG._5
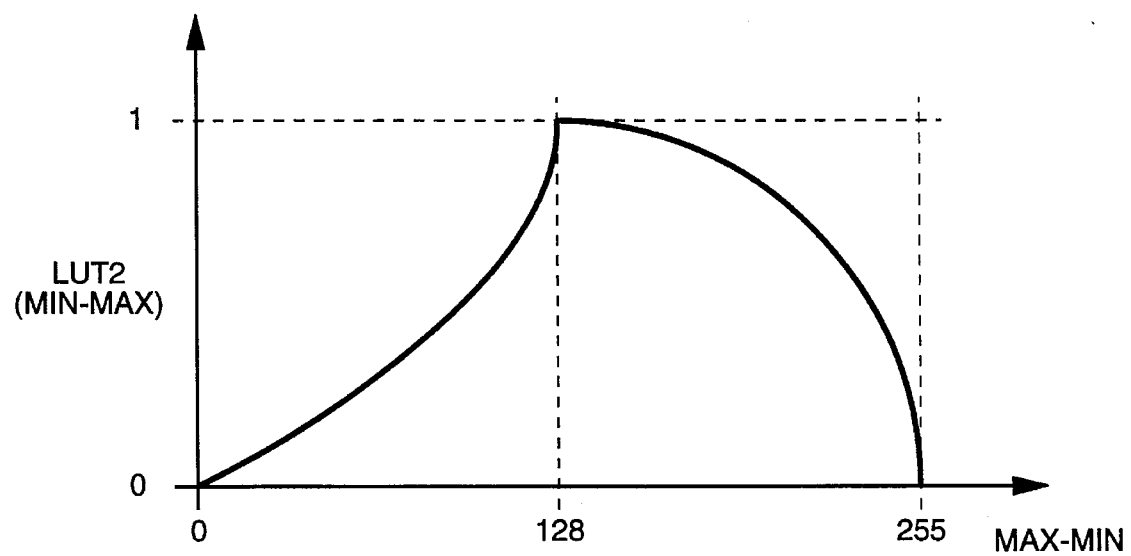
FIG._6

APPARATUS AND METHOD FOR ENHANCING COLOR SATURATION IN HALFTONED IMAGES

CROSS REFERENCE TO RELATED APPLICATIONS

The following applications, filed on an even date herewith and assigned to the assignee of the instant application contain related subject matter to the instant application:

IMPROVED METHOD AND APPARATUS FOR VIVID COLOR CORRECTION IN BINARY PRINTING DEVICES, Ser. No. 08/320,538 filed by Joseph S. Shu;

IMPROVED METHOD AND APPARATUS FOR REDUCING ARTIFACTS IN HALFTONED IMAGES USING GRAY BALANCE CORRECTION, Ser. No. 08/320,539 filed by Joseph S. Shu, now patented, U.S. Pat. No. 5,469,276;

IMPROVED ADAPTIVE FILTERING AND THRESHOLDING ARRANGEMENT FOR REDUCING GRAININESS OF IMAGES, Ser. No. 08/320,550 filed by Joseph S. Shu;

IMPROVED METHOD AND APPARATUS FOR TONAL CORRECTION IN BINARY PRINTING DEVICES BY PREDISTORTION OF IMAGE DATA UTILIZING INK REDUCTION PROCESSING, Ser. No. 08/320,542 filed by Joseph S. Shu;

IMPROVED METHOD AND APPARATUS FOR DITHER ARRAY GENERATION TO REDUCE ARTIFACTS IN HALFTONED IMAGE DATA UTILIZING INK REDUCTION PROCESSING, Ser. No. 08/320,534 filed by Joseph S. Shu; and METHOD AND APPARATUS FOR MINIMIZING ARTIFACTS IN IMAGES PRODUCED BY ERROR DIFFUSION HALFTONING DATA UTILIZING INK REDUCTION PROCESSING, Ser. No. 08/320,537 filed by Joseph S. Shu.

BACKGROUND OF THE INVENTION

1. Field of the Invention

The present invention relates to digital printing devices, and, in particular, to methods and apparatus for enhancing color saturation for use in halftoning operations that convert a color input to a binary output suitable for printing.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of monochrome printers, all of the dots are printed with a single color whereas with color printers a dot color is chosen from a small set of colors. In any case, the dot itself has a uniform color so that the resulting output consists of an array of colored and blank pixels.

Pictorial images such as those produced by photographic techniques or by computerized imaging systems, by contrast, are continuous in tonality. If a monochrome image is divided into pixels, each pixel exhibits a "grayscale" color whose tonal value falls within a range of tonal values. Similarly, if a color image is divided into pixels, each pixel exhibits a hue and an intensity both of which fall in ranges. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which are provided to the printing device. In order to convert the format of each word into a format suitable for reproduction on the digital device, halftoning is performed on the digital word stream during a process called preprocessing. Numerous halftoning techniques have been developed and refined over the years. In their simplest form, such techniques compare the value of each digital word with a threshold level, and generate a binary output pixel value depending on the relative values.

For example, a digital scanner processing a continuous-tone monochrome image might generate a stream of multi-bit words representing the detected light intensities. Commonly, the numerical value of these words ranges from 0 to 255, corresponding to a 256-level gray scale or an eight-bit word. If such a digital word stream is to be reproduced on a binary printing device, the halftoning process compares the scanner output words with a either a single threshold value or an array of threshold values to produce the required binary output pixel stream. In such a system, each 8-bit scanner word has effectively been compressed into a single-bit output word.

Color images are typically processed by separating each color into one or more color components or "primaries" whose superposition generates the desired color. Generally, three primary colors (either the conventional "additive" primary colors— red, green and blue or the conventional "subtractive" primary colors—cyan, magenta and yellow) are used. A digital scanner processing a continuous-tone color image might generate a stream of multi-bit words for each of the three color components (usually the additive primary colors). Commonly, the numerical value of these words also ranges from 0 to 255, corresponding to 256 intensity levels or an eight-bit word. Thus, each colored pixel is represented by 3 eight-bit words or 24 bits total.

The digital word stream corresponding to a colored image is halftoned by comparing the eight-bit word for each color component with a threshold value in the same manner as monochrome processing. The color components are processed separately so that the three 8-bit scanner words are compressed into a three-bit output word which is eventually printed as three dots—each dot being printed in one of the primary colors.

Theoretically, it is possible to reproduce the full range of printable colors using varying intensities of the three primary colors and superimposing the three dots. For example, if the maximum intensity of each color is printed and the three dots are superimposed, the resulting dot should appear as black. In practice, however, superimposing or overprinting 100% of each primary color produces a gray-brown colored dot and completely saturates the paper with ink so generally black is added as a fourth color. Thus, the colors used are red, green, blue and black (RGBK) or cyan, magenta, yellow and black (CMYK). The black value is also subject to thresholding in order to generate a halftoned output so that the final output to the printer comprises four bits—one bit for each of the three primary color values and black (R, G, B and K).

The effect of the halftoning operation is to convert a solid color or gray area into a pattern of colored or black dots interspersed with white spaces or "dots" (where no dots have been printed). The viewer's eye integrates the pattern of dots and produces the perception of a desired color or gray shade. However, the presence of the white dots in areas which should consist entirely of a color reduces the perceived intensity, or saturation, of the color so that the color appears somewhat "washed out" to an objective observer as compared to the original image.

Accordingly, it is an object of the present invention to provide an apparatus and a method for improving the perceived color saturation of halftoned color images.

It is another object of the present invention to provide an apparatus and a method for improving the perceived color saturation in halftoned color images without introducing visual artifacts into the halftoned image.

It is yet a further object of the present invention to provide an apparatus and a method for improving the color saturation of halftoned color images which apparatus and method can be easily and inexpensively implemented.

SUMMARY OF THE INVENTION

The foregoing problems are solved and the foregoing objects are achieved in one illustrative embodiment of the invention in which adaptive preprocessing is performed on the original primary color signals in order to enhance the intensity of the dominant primary color. This preprocessing is performed by removing a small increment from the least intense primary color and adding the same increment to the most intense primary color. In this manner the overall brightness of the pixel is preserved, but the perceived saturation is increased. The increment that is effectively transferred from the least intense primary color value to the most intense primary color value is based on the relations of the three primary color values to each other in order to avoid visible color artifacts.

BRIEF DESCRIPTION OF THE DRAWINGS

The foregoing discussion will be understood more readily from the following detailed description of the invention, when taken in conjunction with the accompanying drawings, in which:

FIG. 1 is a block schematic diagram of a computer system, for example, a personal computer system on which a halftoning operation using a K separation screen created with the inventive method and apparatus can operate.

FIG. 2 is a schematic block diagram of a prior art computer system showing the relationship of an application program, an operating system and a printer driver in which the halftoning operation is performed.

FIG. 3 is a more detailed block diagram illustrating the construction of the printer driver.

FIGS. 4A–4C, when placed together, form a flowchart of an illustrative method for processing the three primary color values associated with each pixel in accordance with the inventive apparatus and method.

FIG. 5 is a graph illustrating the distribution of values retrieved from a first lookup table and used to calculate the increment transferred from the least intense primary color value to the most intense primary color value.

FIG. 6 is a graph illustrating the distribution of values retrieved from a second lookup table and used to calculate the increment transferred from the least intense primary color value to the most intense primary color value.

DETAILED DESCRIPTION OF THE PREFERRED EMBODIMENTS

The invention is preferably practiced in the context of an operating system which is resident on a personal computer such as the IBM®, PS/2® or Apple® Macintosh® computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122 such as a video monitor. The workstation has resident thereon and is controlled and coordinated by operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the halftoning operations, are specific to the printing device and are usually contained in a software program called a "driver" which may be part of the operating system, but must be specifically associated with a particular printing device. The driver program receives textual and image information from the computer system and performs the processing as described above to generate signals that can directly control the printing device.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computers systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 210. The printer driver software 210 generally performs halftoning operations and may perform other operations to produce a reformatted information stream containing embedded commands and converted graphical information as shown schematically as arrow 214. The converted information stream is, in turn, applied to a printer port 212 which contains circuitry that converts the incoming information stream into electrical signals. The signals are, in turn, sent over a cable 216 to the printer 218. Printer 218 usually contains a "imaging engine" which is a hardware device or a ROM-programmed computer which takes the incoming information stream and converts it into the electrical signals necessary to drive the actual printing elements. The result is a "hard copy" output on the selected medium.

FIG. 3 shows, in more detail, the structure of the printer driver 210 shown on FIG. 2. In particular, as previously mentioned, a traditional source of color information is a scanner application program 300. The scanner breaks the original image into pixels and produces a 24-bit signal representing the color of each pixel expressed as three 8-bit encoded intensities of the three primary colors (R,G,B). These three 8-bit signals are represented by arrows 302,304 and 306, respectively.

The 24-bit pixel color signal is provided to a printer driver 318 which comprises a preprocessor 308 and a halftoning circuit 320. The preprocessor 308 performs several operations on the input primary color values prior to halftoning. In particular, among the preprocessing operations, the fourth color (black) is usually generated by a process known as "under-color removal." In this process, the values of the three primary colors are compared and the lowest color value is subtracted from all of the primary color values and assigned to the black value. The result of the under color removal operation is four 8-bit numbers consisting of a red value (R), a green value (G), a blue value (B) and a black value (K). These four 8-bit numbers are shown schematically as arrows 310–316. In many systems the four color values are also converted into "subtractive" primary color values cyan, magenta, yellow and black (C, M, Y and K) at this point.

The four 8-bit values are applied to halftoning circuit 320 which, in a conventional manner, compresses the 32-bit signal into a 4-bit signal which is applied to the printer 322.

In accordance with the principles of the present invention, the preprocessor 308 can also include the inventive apparatus and method for adaptively increasing the perceived saturation of the dominant primary color. The processing to increase the perceived saturation would be performed before undercolor removal processing.

More specifically, FIGS. 4A–4C, when placed together, form a flowchart illustrating the steps in the inventive method used to enhance the saturation of a halftone color image. The inventive method first checks to make sure the particular pixel is not a gray pixel (R=G=B). If this is the case, then no processing is performed on the pixel. Otherwise, as previously mentioned, an incremental amount called "delta" is subtracted from the minimum primary color value and added to the maximum primary color value. As will be hereinafter explained in detail, the determination of the increment that is moved from the minimum to the maximum color value is done adaptively (using lookup tables to retrieve predetermined values) to ensure that no visual discontinuity occurs do to the saturation enhancement processing.

The routine shown in FIGS. 4A–4C begins in step 400 and proceeds to steps 402 and 404 where a determination is made as to whether the pixel represents a gray color (R=G=B). In step 402 a determination is made whether R=G and, in step 404, a determination is made whether the R=B. If the answer to both of these determinations is "yes ", then the pixel is a gray pixel and is not processed. Accordingly, the routine proceeds, via offpage connectors 414, 418, 440 and 444 to finish at step 454.

However, if it is determined in steps 402 and 404 that the pixel is not a gray pixel (either R is not equal to G or R is not equal to B) then the routine proceeds to steps 406–410 in which several processing variables are determined. More particularly, in step 406, the numerical average of the R, G and B values is calculated by adding the values together and dividing by three and the resulting quotient is assigned to a variable denoted as "average". Next, in step 408, the minimum value of the three primary color values is selected and assigned to a variable "min." Then, in step 410, the maximum value of the three primary color values is assigned to a variable "max".

Next, the routine proceeds, via offpage connectors 412 and 416, to step 420 in which the value of a variable "delta" is calculated by using the average value computed in step 406 to retrieve a value from a first lookup table (designated as lookup table 1—LUT1). The retrieved value is multiplied by a second value retrieved from a second lookup table (LUT2) using the difference between the maximum and minimum values determined in steps 410 and 408, respectively. Finally, the two values obtained from the lookup tables are multiplied together and multiplied by a predetermined constant (k). The constant, k, allows the effect of the enhancement to be varied to suit a particular image (the value of k ranges from 0 to 100%).

The use of two lookup tables enables the delta value to be determined "adaptively" so that it is dependent not only on the average saturation of the pixel as determined by the first lookup table, but it is also dependent on the difference between the maximum and minimum values. This difference determines how "far away" from a "neutral" or gray shade the color of the pixel lies. The values stored in the lookup tables are discussed hereinafter in detail below.

Once the delta value has been determined, it is applied to the maximum and minimum primary color values as determined in the remainder of the method. Each color value is separately treated by four steps. For example, the red primary color value (R) is processed by steps 422–428. In particular, in step 422, a determination is made to see whether the R value is equal to the minimum value determined in step 408. If it is, the delta value is subtracted from this value in step 426. Alternatively, if the R value is not a minimum, then a check is made at step 424 to determine whether it is a maximum. If so, the delta value is added to the R value in step 428. If the R value is either a minimum or a maximum, no processing is performed and the routine proceeds to step 430.

The green value (G) is processed in a similar manner in steps 430–436. The routine then proceeds, via offpage connectors 438 and 442, to process the blue value (B) in steps 446–452. Finally the routine terminates in step 454.

As previously mentioned, two lookup tables are used to determine the delta value which is removed from the minimum primary color value and added to the maximum primary color value. In order to adaptively increase the saturation of each pixel, there are two considerations. The first consideration is that the maximum delta which can be transferred from the lowest primary color value to the highest primary color value is constrained by the primary color values themselves. The subtraction of the delta value from the minimum primary color value cannot be allowed to produce a negative result since the smallest color value is zero. Similarly, the addition of the delta value cannot be allowed to increase the largest primary color value over 255 (the maximum allowed).

Consequently, it can be seen that as the primary color values approach either their minimum (0) or their maximum (255), that the delta value must approach zero. The largest delta value can be transferred when the average of the primary color values is the largest. The first lookup table is used to impart this behavior to the delta value by yielding a result which will be used to multiply the delta value.

Therefore, the values in the first lookup table (LUT1) must approach zero when the average of the three primary color approaches zero and the values must also approach zero when the average of the three primary colors approaches 255. The maximum values will occur when the average is between 0 and 255 (about 128). Based on these considerations, the values stored in lookup table 1 must be distributed as shown in the graph illustrated in FIG. 5. In particular, the horizontal axis plots the value of the average of the three primary color values increasing towards the right of the figure. The vertical axis plots the corresponding value of the lookup table constant which is retrieved for a given average value increasing in the upwards direction.

As can be seen in FIG. 5, the values stored in the lookup table fall on a curve which is symmetric about the average value (128) and approaches zero at either extreme. The curve shown in FIG. 5 has been arbitrarily chosen to be a semicircle. However, other curves could also be used. For example, a triangular curve could be used as could any other curve which is symmetric about the midpoint (128). A continuous curve is shown in FIG. 5 which could be obtained using function generators. An alternative implementation of the lookup table would be to use an addressable memory to store discrete values which fall on the curve shown in FIG. 5 and then use the average value as an address into the memory to retrieve the stored values.

Another consideration when determining the delta value is that it is necessary to ensure no abrupt shifts occur in the R, G and B primary color values which, in turn, would lead to a visible color "artifact" or discontinuity. In particular, a large delta should not be transferred in a near neutral or gray shade where the minimum and maximum primary color values are very similar in value. Consequently, a second lookup table (LUT2) is used to insure that no such discontinuity occurs. In this second table the stored values fall on a curve similar to that shown in FIG. 6.

In FIG. 6, the horizontal axis represents the difference between the maximum primary color value and the minimum primary color value increasing to the right. The vertical axis represents the value of the constant retrieved from the lookup table increasing in the upwards direction. As can be seen in FIG. 6, a minimum value will be retrieved from lookup table 2 when the difference between the maximum and minimum primary color values is small. Since the retrieved value is multiplied with the delta value, the delta value will also be small. The small delta value prevents a large change from occurring in the most sensitive region.

As the difference value increases, the delta value will also increase, however, the increased delta value is less noticeable in this case. It has been found that a quadratic curve (the curve shown in the left half of FIG. 6) gives good results, but any other similar curve which increases from 0 and reaches a maximum at the mid (128) value could also be used. Between the mid value of 128 and the maximum value of 255, the delta value must decrease in order to avoid exceeding either the maximum value (255) when the delta value is added to the dominant color value or falling below the minimum value (0) when the delta value is subtracted from the smallest color value. A curve which has been found to produce good results is a quarter circle as shown in FIG. 6. However, other relationships can also be used where the lookup table value decreases from a maximum at the mid point (128) to zero at the maximum (255).

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. Apparatus for enhancing color saturation in a halftone image comprised of a plurality of pixels, each pixel having a color comprised of three primary color values, the apparatus processing each of the plurality of pixels and comprising:

means responsive to the three primary color values of a pixel for selecting the maximum primary color value;

means responsive to the three primary color values of a pixel for selecting the minimum primary color value; and means responsive to the maximum primary color value and the minimum primary color value for subtracting an incremental amount from the minimum primary color value and adding the incremental amount to the maximum primary color value, the incremental amount being dependent on the maximum primary color value and the minimum primary color value and being determined in order to minimize visual artifacts in the halftone image.

2. Apparatus for enhancing color saturation in a halftone image according to claim 1 wherein each of the three primary color values has a lower limit and an upper limit and the apparatus further comprises:

means responsive to the three primary color values of a pixel for calculating an average primary color value; and means responsive to the average primary color value for determining the incremental amount so that the maximum primary color value plus the incremental amount does not exceed the upper limit and the minimum primary color value minus the incremental amount does not fall below the lower limit.

3. Apparatus for enhancing color saturation in a halftone image according to claim 1 wherein the means for subtracting and adding the incremental amount comprises:

means responsive to the maximum primary color value and the minimum primary color value for calculating a difference between the maximum primary color value and the minimum primary color value; and means responsive to the difference for adjusting the incremental amount in order to minimize visual artifacts in the halftone image.

4. Apparatus for enhancing color saturation in a halftone image according to claim 3 wherein the adjusting means comprises means responsive to the difference for increasing the incremental amount as the difference increases.

5. Apparatus for enhancing color saturation in a halftone image according to claim 1 wherein the means for subtracting and adding the incremental amount comprises:

means responsive to the maximum primary color value and the minimum primary color value for increasing the incremental amount as a difference between a pixel color and a neutral color increases and for decreasing the incremental amount as a difference between the pixel color and the neutral color decreases.

6. Apparatus for enhancing color saturation in a halftone image comprised of a plurality of pixels, each pixel having a color comprised of three primary color values, the apparatus processing each of the plurality of pixels and comprising:

a minimum circuit responsive to the three primary color values of a pixel for selecting the maximum primary color value;

a maximum circuit responsive to the three primary color values of the pixel for selecting the minimum primary color value;

an averaging circuit responsive to the three primary color values of the pixel for calculating an average primary color value;

means responsive to the maximum primary color value, the minimum primary color value and the average primary color value for calculating an incremental amount, the incremental amount being dependent on the maximum primary color value and the minimum primary color value and the average primary color value and being determined in order to minimize visual artifacts in the halftone image;

a subtractor responsive to the incremental amount for subtracting the incremental amount from the minimum primary color value; and an adder responsive to the incremental amount for adding the incremental amount to the maximum primary color value.

7. Apparatus for enhancing color saturation in a halftone image according to claim 6 wherein the calculating means comprises:

means responsive to the maximum primary color value and the minimum primary color value for increasing the incremental amount as a difference between a pixel color and a neutral color increases and for decreasing the incremental amount as a difference between the pixel color and the neutral color decreases; and means responsive to the average primary color value for limiting the incremental amount so that the maximum primary color value plus the incremental amount does not exceed the upper limit and the minimum primary color value minus the incremental amount does not fall below the lower limit.

8. Apparatus for enhancing color saturation in a halftone image according to claim 7 wherein the means for increasing and decreasing the incremental amount comprises:

means responsive to the maximum primary color value and the minimum primary color value for calculating a difference between the maximum primary color value and the minimum primary color value; and means responsive to the difference for adjusting the incremental amount in order to minimize visual artifacts in the halftone image.

9. Apparatus for enhancing color saturation in a halftone image according to claim 8 wherein the adjusting means comprises a function generator responsive to the difference for generating a first factor; and a multiplier responsive to the first factor for multiplying the incremental amount by the first factor.

10. Apparatus for enhancing color saturation in a halftone image according to claim 8 wherein the adjusting means comprises a lookup table stored in a memory and means responsive to the difference for accessing the lookup table to retrieve a first factor; and a multiplier responsive to the first factor for multiplying the incremental amount by the first factor.

11. Apparatus for enhancing color saturation in a halftone image according to claim 7 wherein the limiting means comprises a function generator responsive to the average amount for generating a second factor; and a multiplier responsive to the second factor for multiplying the incremental amount by the second factor.

12. Apparatus for enhancing color saturation in a halftone image according to claim 7 wherein the limiting means comprises a lookup table stored in a memory and means responsive to the average amount for accessing the lookup table to retrieve a second factor; and a multiplier responsive to the second factor for multiplying the incremental amount by the second factor.

13. A method for enhancing color saturation in a halftone image comprised of a plurality of pixels, each pixel having a color comprised of three primary color values, the method processing each of the plurality of pixels and comprising the steps of:

A. selecting the maximum primary color value of the three primary color values of a pixel;

B. selecting the minimum primary color value of the three primary color values of the pixel; and C. subtracting an incremental amount from the minimum primary color value and adding the incremental amount to the maximum primary color value, the incremental amount being dependent on the maximum primary color value and the minimum primary color value and being determined in order to minimize visual artifacts in the halftone image.

14. A method for enhancing color saturation in a halftone image according to claim 13 wherein each of the three primary color values has a lower limit and an upper limit and the method further comprises the steps of:

D. calculating an average primary color value from the three primary color values of a pixel; and E. determining the incremental amount from the average primary color value so that the maximum primary color value plus the incremental amount does not exceed the upper limit and the minimum primary color value minus the incremental amount does not fall below the lower limit.

15. A method for enhancing color saturation in a halftone image according to claim 13 wherein step C comprises the steps of:

C1. calculating a difference between the maximum primary color value and the minimum primary color value; and C2. adjusting the incremental amount based on the difference in order to minimize visual artifacts in the halftone image.

16. A method for enhancing color saturation in a halftone image according to claim 15 wherein step C2 comprises the step of:

C2A. increasing the incremental amount as the difference increases.

17. A method for enhancing color saturation in a halftone image according to claim 13 wherein step C comprises the steps of:

C3. increasing the incremental amount as a difference between a pixel color and a neutral color increases; and C4. decreasing the incremental amount as a difference between the pixel color and the neutral color decreases.

18. A method for enhancing color saturation in a halftone image comprised of a plurality of pixels, each pixel having a color comprised of three primary color values, the method processing each of the plurality of pixels and comprising the steps of:

A. selecting the maximum primary color value of the three primary color values of a pixel;

B. selecting the minimum primary color value of the three primary color values of the pixel;

C. calculating an average primary color value of the three primary color values of the pixel;

D. calculating an incremental amount based on the maximum primary color value, the minimum primary color value and the average primary color value, the incremental amount being dependent on the maximum primary color value and the minimum primary color value and the average primary color value and being determined in order to minimize visual artifacts in the halftone image;

E. subtracting the incremental amount from the minimum primary color value; and

F. adding the incremental amount to the maximum primary color value.

19. A method for enhancing color saturation in a halftone image according to claim 18 wherein step D comprises the steps of:

D1. increasing the incremental amount as a difference between a pixel color and a neutral color increases;

D2. decreasing the incremental amount as a difference between the pixel color and the neutral color decreases; and D3. limiting the incremental amount so that the maximum primary color value plus the incremental amount does not exceed the upper limit and the minimum primary color value minus the incremental amount does not fall below the lower limit.

20. A method for enhancing color saturation in a halftone image according to claim 19 wherein step D1 comprises the steps of:

D1A. calculating a difference between the maximum primary color value and the minimum primary color value; and D1B. adjusting the incremental amount based on the difference in order to minimize visual artifacts in the halftone image.

21. A method for enhancing color saturation in a halftone image according to claim 20 wherein step D1B comprises the step of:

D1B1. generating a first factor using a function generator which is responsive to the difference;

D1B2 multiplying the incremental amount by the first factor.

22. A method for enhancing color saturation in a halftone image according to claim 20 wherein step D1B comprises the steps of:

D1B3. creating a lookup table stored in a memory;

D1B4. accessing the lookup table using the difference to retrieve a first factor; and D1B5. multiplying the incremental amount by the first factor.

23. A method for enhancing color saturation in a halftone image according to claim 19 wherein step D3 comprises the steps of:

D3A. generating a second factor using a function generator which is responsive to the average amount; and D3B. multiplying the incremental amount by the second factor.

24. A method for enhancing color saturation in a halftone image according to claim 19 wherein step D3 comprises the steps of:

D3C. creating a lookup table stored in a memory;

D3D. accessing the lookup table using the average amount to retrieve a second factor; and D3E. multiplying the incremental amount by the second factor.

* * * * *